United States Patent [19]

Heim

[11] Patent Number: 4,644,432
[45] Date of Patent: Feb. 17, 1987

[54] THREE POLE SINGLE ELEMENT MAGNETIC READ/WRITE HEAD

[75] Inventor: David E. Heim, Menlo Park, Calif.

[73] Assignee: International Business Machines, Armonk, N.Y.

[21] Appl. No.: 695,647

[22] Filed: Jan. 28, 1985

[51] Int. Cl.$^4$ .................. G11B 5/17; G11B 5/147; G11B 15/12
[52] U.S. Cl. .................. 360/123; 360/124; 360/126; 360/62
[58] Field of Search ............... 360/111, 119, 121, 122, 360/123, 124, 125, 126, 62

[56] References Cited

U.S. PATENT DOCUMENTS

| 2,633,504 | 3/1953 | Beer | 179/100.2 |
|---|---|---|---|
| 3,239,823 | 3/1966 | Chang | 360/111 |
| 3,295,117 | 12/1966 | Ault et al. | 340/174.1 |
| 3,653,011 | 3/1972 | Donohue et al. | 340/174.1 |
| 3,881,191 | 4/1975 | Potter et al. | 360/121 |
| 4,044,394 | 8/1977 | Hanazano et al. | 360/123 |
| 4,190,872 | 2/1980 | Jones et al. | 360/125 |
| 4,219,854 | 8/1980 | Church et al. | 360/125 |
| 4,219,855 | 8/1980 | Jones, Jr. | 360/125 |
| 4,385,334 | 5/1983 | Yanagida | 360/123 |
| 4,404,609 | 9/1983 | Jones, Jr. | 360/123 |
| 4,458,280 | 7/1984 | Cunningham | 360/125 |
| 4,553,177 | 11/1985 | Scholich | 360/121 |

Primary Examiner—Robert S. Tupper
Assistant Examiner—Melissa J. Koval
Attorney, Agent, or Firm—Otto Schmid, Jr.

[57] ABSTRACT

A magnetic head has three pole pieces that form a magnetic circuit. The magnetic pole pieces are arranged in a common plane so that the two outside pole pieces are each spaced from the central pole piece to form a transducing gap between each of the outside pole pieces and the central pole piece. A first and a second coil, each having the same magnetic sense, is wound on the magnetic structure between an outside and the center pole piece. The coils are connected in series for a write operation so that the flux in the outside pole pieces is additive for writing, and the coils are connected in series opposition for a read operation so that the flux produced in the center pole by a previously recorded magnetic transition in the magnetic recording medium adjacent to the transducing gaps is sensed additively in the coils.

10 Claims, 8 Drawing Figures

THREE POLE SINGLE ELEMENT MAGNETIC READ/WRITE HEAD

BACKGROUND OF THE INVENTION

1. Field of the Invention

This invention relates to magnetic read/write heads, and more particularly to such heads having a single element, three pole structure.

2. Description of the Prior Art

In magnetic recording technology it is constantly desired to improve the areal density at which information can be recorded and reliably read. This desire has lead to a trend toward greater bit density along a magnetic recording track and a shrinking track width.

For a time the problem was solved by the use of separate read and write head. However as the recording density increased, problems of cost and packaging density made this solution no longer acceptable in many applications.

Magnetic heads were then designed so that one head could be used for both reading and writing. Further increases in the recording density have made it progressively more difficult to optimize the reading and writing functions simultaneously in a single element read/write head. For example, to delay the onset of magnetic saturation in the head during writing, the pole tips should be relatively thick; however, to produce good read resolution and increase the linear recording density, the pole tips should be relatively thin.

SUMMARY OF THE INVENTION

It is therefore the principle object of this invention to provide a single element three pole magnetic head so that optimum reading and writing can be achieved with one read/write head.

In accordance with the invention, a magnetic head has three pole pieces that form a magnetic circuit. The pole pieces are arranged so that the outside pole pieces are each spaced from a central pole piece to form a transducing gap between each of the outside pole pieces and the central pole piece. A first and a second coil is wound on the magnetic structure between an outside and the center pole of the pole pieces. The coils are connected for a write operation so that the flux in the outside magnetic pole pieces is additive for writing. The coils are connected for a read operation so that the flux induced in the center poles by a previously recorded magnetic transition in the magnetic recording medium adjacent the transducing gaps is sensed additively in the coils.

In a specific embodiment the first and second coils each have the same magnetic sense, and the coils are connected in series for a write operation and in series opposition for a read operation.

This magnetic head design permits the reading and writing functions to be optimized simultaneously since the structure enables these functions to be separated. The head can be designed for optimum read operation since the read resolution is controlled by the transducing gap, assuming a thin center pole, and is independent of outer pole thickness. The head can also be designed for optimum write operation since the center pole plays no role in writing, and therefore the design permits the use of thick outer poles to delay the onset of magnetic saturation of their respective magnetic layers during writing.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

Figure 1:
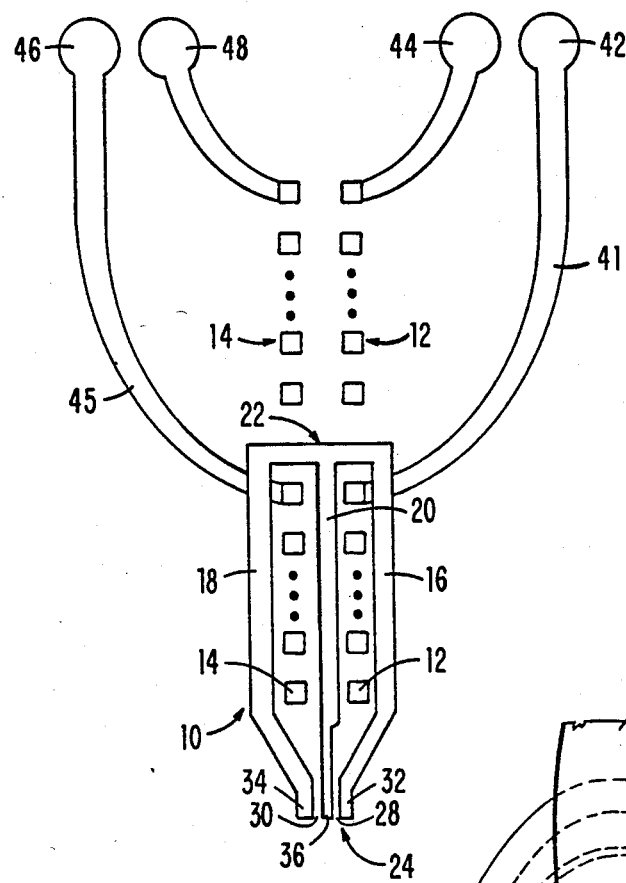
FIG. 1 is a sketch showing a conceptual view of a three pole magnetic head embodying the invention.
Figure 2:
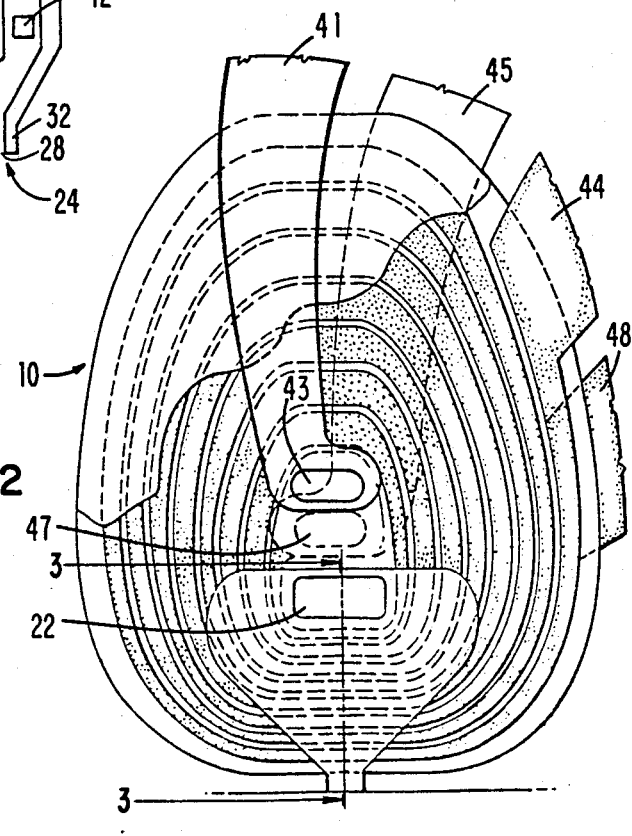
FIG. 2 is a top plan view of a three pole magnetic head embodying the invention.
Figure 3:
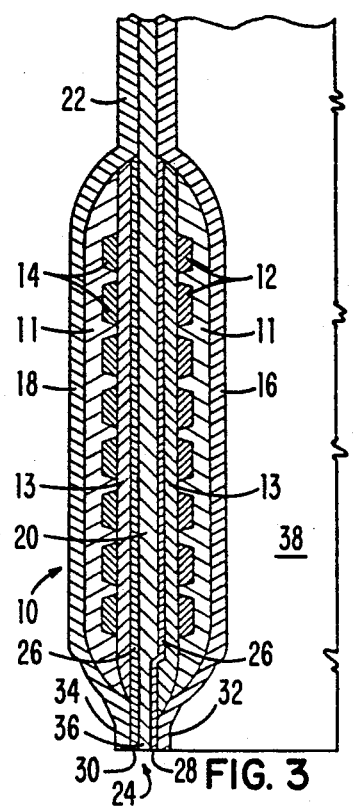
FIG. 3 is a sectional view taken along line 3—3 of FIG. 2.

The magnetic head comprising the invention is shown in a conceptual drawing in FIG. 1, and is shown in a specific embodiment, which can be fabricated by thin film techniques, in FIGS. 2 and 3.

The magnetic head 10 according to the invention comprises a first planar spiral coil 12 and a second planar spiral coil 14 each having a plurality of turns produced between two layers of insulating material 11, 13. A magnetic yoke structure comprises two outer layers of a magnetic material 16, 18, such as Permalloy, and a center magnetic layer 20. The magnetic layers are separated by the layers of insulating material 11, 13 except at the back gap closure 22 where they make physical contact and at the pole tip region 24 where they are spaced by a thin layer 26 of non-magnetic material to form transducing gaps at 28, 30. The outer pole tips 32, 34 are relatively thick while the center pole tip 36 is relatively thin. The ends of transducing gaps 28, 30 coincide with an air bearing surface (ABS) formed on a non-magnetic ceramic slider 38 on which the above-described layers are deposited. Transducer gaps 28, 30 interact in air bearing relation with a magnetic recording medium 40 (FIGS. 5 and 6), such as a rotatable magnetic disk, when the latter rotates and the head flies with the ABS closely adjacent to the surface of the magnetic recording medium 40.

Each of the flat spiral coils are provided with pads for making electrical contact with the coils. The first coil 12 is provided with a first pad 42 for making electrical contact with the center portion of the coil 12 through conductor 41 and electrical contact 43 and the outermost turn of the coil 12 terminates in a second pad 44 which constitutes an electrical terminal for the coil 12. The second coil 14 is provided with a first pad 46 for making contact with the center portion of the coil 14 through conductor 45 and electrical contact 47 and a second pad 48 which terminates the outermost turn of coil 14 to provide an electrical terminal to coil 14.

The coils 12 and 14 are wound in the same sense, that is, as shown in FIG. 2, the conductor coil starts at pad 42, goes through conductor 41 and contact 43 to the center of the spiral coil. The coil 12 proceeds in a counterclockwise spiral direction around the back gap closure 22 and the contact area, which includes contacts 43 and 47, and proceeds in a counterclockwise expanding spiral direction through all the coil turns to the pad 44. Coil 14 correspondingly starts at pad 46 and continues through a similar path through conductor 45, terminal 47, and through the coil turns to pad 48. It should be understood that the direction of the winding is not limiting on the present invention since the direction is arbitrary.

According to a feature of the invention, the magnetic head is fabricated by thin film techniques in the following manner. First magnetic layer 16 is deposited on a suitable substrate 38, and then the insulating layer 11 is deposited over magnetic layer 16 except at the back gap closure 22 and the pole tip region 24. Elliptically spiralling turns of continuous flat conductor coil 12 are plated on insulating layer 11. Then insulating layer 13 is deposited over the coil, followed by the deposition of thin non-magnetic layer 26. Thin non-magnetic layer 26 extends to the ABS but does not extend to the back gap closure 22. The thickness of non-magnetic layer 26 is closely controlled since this layer defines the transducer gap 28. Central magnetic layer 20 is deposited on non-magnetic layer 26 in two stages, using appropriate masks, to provide a deposit of reduced thickness in the pole tip region 24 and a greater thickness along the rest of the central magnetic layer 20 to the back gap closure 22. A second non-magnetic layer 26 is then deposited to form the transducing gap 30. A subsequent layer 11 of insulating material is deposited, and the multi-turn coil 14 is plated on insulating layer 11. A layer 13 of insulating material is deposited over the coil 14, and this is followed by the deposition of magnetic material 18, to complete the magnetic head.

According to a feature of the invention, the coils 12 and 14 are connected so that the flux in the magnetic pole pieces is additive for writing, and the coils 12 and 14 are connected for reading so that a previously recorded magnetic transition in the recording media adjacent the transducing gaps is sensed additively in the coils. The coils 12 and 14 are shown in the drawing and will be described in the specification as being wound in the same sense, but it will be recognized by those skilled in the art that equivalent operation can be achieved by coils wound in opposite sense by appropriately changing the coil connections. When the coils 12 and 14 are wound in the same sense, the coils are connected in series for writing, and in series opposition for reading.

Figure 5:
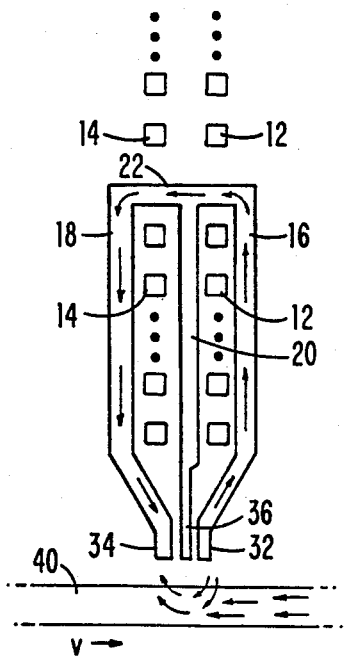
FIG. 5 is a diagram showing the magnetic path in the magnetic heads of FIGS. 1 and 2 during a writing operation.

To accomplish writing, in the illustrated embodiment, pads 44 and 46 are connected together and pads 42 and 48 are driven by the write driver. Under this mode of operation the center pole plays no role, assuming that the head is symmetrical about the plane of the center pole. As shown in FIG. 5, the flux produced in the magnetic core produces a written pattern in the adjacent magnetic media. Should there be some asymmetry in the head there will be some flux in the center pole. However this will be a minor perturbation on the field penetrating the medium, and this should leave relatively undisturbed the field near the trailing edge of the gap, where the critical writing zone is located.

Figure 6:
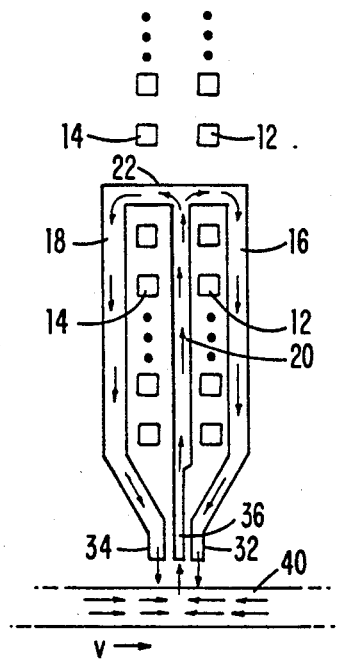
FIG. 6 is a diagram showing the magnetic path in the magnetic heads of FIGS. 1 and 2 during a reading operation.

To read, the two coils 12, 14 are connected in series opposition. The flux generated in the center pole 20 and side poles 16, 18 by a previously recorded transition near the gaps 28, 30, as shown in FIG. 6, induces voltages across the terminals of each coil 12, 14 which add constructively when connected in series opposition. This mode of operation is accomplished by connecting pad 44 to pad 48 and sensing the READ signal that appears across terminal pads 42 and 46.

Figure 8:
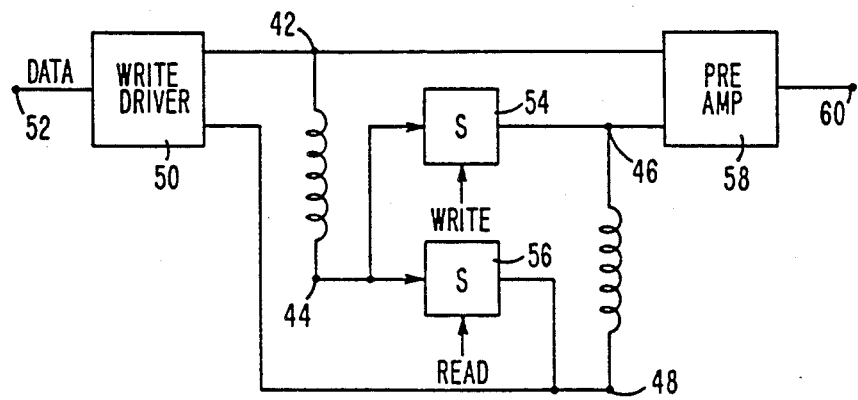
FIG. 8 is a schematic block diagram of the circuit control means for selectively connecting coils 12 and 14 for either a READ or WRITE operation.

A specific embodiment of the control circuit means for selectively connecting the coils 12, 14 in series in response to a WRITE signal and for selectively connecting the coils 12, 14 in series opposition in response to a READ signal is shown in FIG. 8.

The control circuit means includes the Write Driver 50 to which data to be recorded is coupled at terminal 52. When a WRITE operation is selected, the WRITE signal closes switching means 54 to connect terminal 44 of coil 12 to terminal 46 of coil 14, and the Write Driver 50 is connected across terminal 42 of coil 12 and terminal 48 of coil 14. It can be seen that this circuit operation results in coils 12, 14 being connected in series for the WRITE operation to record the data coupled to terminal 52 on recording medium 40.

When a READ operation is selected, the READ signal is operative to close switching means 56 to connect terminal 44 of coil 12 to terminal 48 of coil 14, and Preamplifier 58 is connected across terminal 42 of coil 12 and terminal 46 of coil 14. It can be seen that this circuit operation results in coils 12, 14 being connected in series opposition for the READ operation, so that a signal similar to that shown in curve 62 of FIG. 7 appears at terminal 60.

Figure 4:
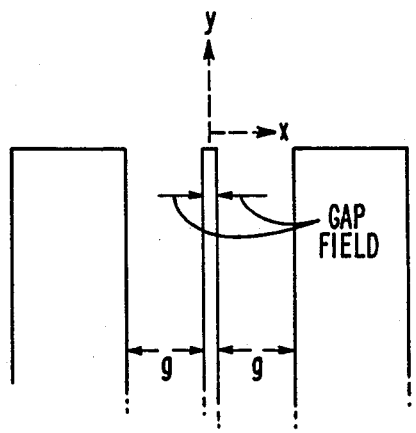
FIG. 4 is a diagram showing the pole tip configuration of the magnetic head embodying the invention.

By the use of an analysis similar to that described in the work by Potter, IEEE Trans Mag, Mag-10 Sept. (74) pp 502–508, it can be shown that the resolution of the present head is equivalent to an inductive two pole head of gap equal to the center pole/outer pole gap 28 or 30. The head produces a signal in response to the time derivative of the flux linked by the coils. To compute the read response of the present three pole magnetic head, reciprocity will be used. Assume that the coil is energized with a unit current. With N turns in each coil and an efficiency $\eta$ in each half of the head there are equal and opposite gap fields induced in the two gaps g as shown in FIG. 4. Following Potter, the x component of the sensitivity function has the form (for negligible center pole dimension)

$$H_x(x,y) = \left(\frac{\eta N}{\pi g}\right) \left\{2 \tan^{-1}\frac{x}{y} - \tan^{-1}\frac{x-g}{y} - \tan^{-1}\frac{x+g}{y}\right\}$$

If we consider an arc-tan transition in a medium moving with velocity v under the head $$M(x,y) = \frac{2M_r}{\pi} \tan^{-1}\left(\frac{x-x_o}{a}\right)$$

$$x_o = vt$$

and assume the medium is thin (thickness=$\delta$) then the voltage induced in the coil per meter of track width is $$e(x_o) = \mu_o v(2M_r\delta)\left(\frac{\eta N}{\pi g}\right)\left[2\tan^{-1}\frac{x_o}{d+a} - \right.$$

$$\left. \tan^{-1}\frac{x_o - g}{d + a} - \tan^{-1}\frac{x_o + g}{d + a} \right]$$

$$x_o = vt$$

Figure 7:
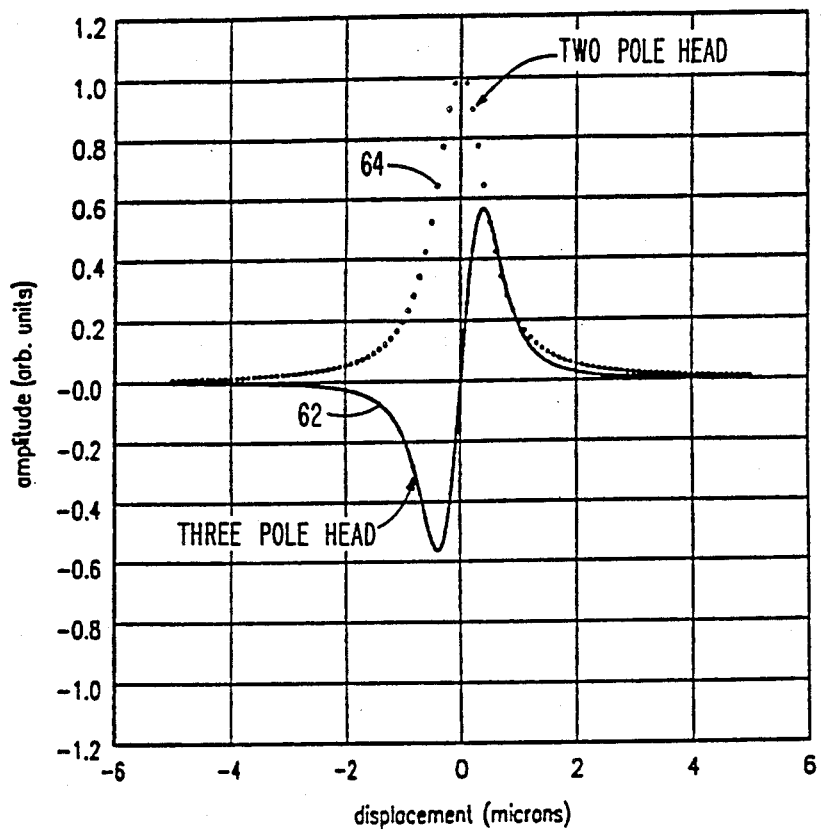
FIG. 7 is a plot of the read signal generated by the magnetic head of FIGS. 1 and 2 in response to an isolated arc-tan transition.

The resulting READ signal is bipolar as shown in FIG. 7 in curve 62. Shown in curve 64 is a unipolar signal of the type sensed by a conventional two pole magnetic head. A common technique for processing the unipolar signal is to differentiate the unipolar signal to produce a bipolar signal and then to detect a zero crossing in the signal. This differentiation commonly results in an equivalent loss of from 10 to 15 db. in signal to noise ratio in the detector. With a bipolar READ signal, as produced by the present invention, the channel is designed to detect zero crossings directly without involving differentiation.

The head can be designed for optimum read operation since the read resolution is controlled by the gap g, assuming a thin center pole, and is independent of outer pole thickness. The center pole tip 36 should be made relatively thin or a small thickness compared to the gap dimension g. For a specific design the center pole tip should be about one-third the gap dimension g, or less, depending on the read resolution required. The resolution is equivalent to a two pole inductive head with gap g. The resulting bipolar READ signal offers advantages over the operation comprising peak detection with a unipolar signal.

The head can also be designed for optimum write operation since the center pole plays no role in writing. This design also permits the use of thick outer poles to delay the onset of magnetic saturation of their respective magnetic layers during writing so that a sufficiently large field is delivered to the magnetic recording medium to switch its magnetic state. The thickness of the outer pole tips 32 and 34 should be much larger than the gap dimension g, for example, three to ten times the gap dimension g. Since the outer poletip thickness does not influence read resolution, this magnetic head enables one to optimize the writing function without paying a penalty in the read resolution characteristics of the magnetic head.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. A magnetic head structure for recording and reading magnetic transitions on a selectable one of a plurality of tracks on a magnetic recording medium comprising:
    a magnetic structure having three spaced pole pieces, said pole pieces comprising outside pole pieces each spaced from a central pole piece to form a transducing gap between each of said outside pole pieces and said central pole piece;
    first and second coils each wound on said magnetic structure between an outside and the center pole of said pole pieces;
    first control circuit means for connecting said coils in a first configuration for a write operation whereby the flux in said magnetic pole pieces is additive for writing; and
    second control circuit means for connecting said coils in a second configuration for a read operation so that a previously recorded magnetic transition in the magnetic recording medium adjacent to said transducing gaps is sensed additively in said coils.

2. The magnetic head structure as in claim 1 wherein said first and second coils each have the same sense, wherein said coils are connected in series for a write operation, and wherein said coils are connected in series opposition for a read operation.

3. The magnetic head structure as in claim 1 wherein each of said pole pieces terminates in pole tips, said pole tips being spaced apart to define said transducing gaps.

4. The magnetic head structure as in claim 3 wherein said pole tips are coplanar.

5. The magnetic head structure as in claim 4 wherein the gap lengths between adjacent pole tips in said common plane are substantially equal.

6. The magnetic head structure as in claim 3 wherein the thickness of said pole tips of said outer pole pieces is relatively thick and the thickness of said pole tip of said central pole piece is relatively thin.

7. The magnetic head structure as in claim 1 additionally comprising circuit means for sensing the voltage induced in said coils when said coils are connected in series opposition whereby a bipolar read signal is sensed.

8. The magnetic head structure as in claim 1 wherein said magnetic structure comprises three spaced pole pieces each having two ends and having a common back gap closure at one end where they make physical contact and being separated by a transducing gap at the other end.

9. The magnetic head structure as in claim 1 wherein said first and second control circuit means comprise a first and second selectively operable switching means.

10. The magnetic head structure as in claim 1 wherein, during a write operation, said flux in said outside pole pieces causes said outside pole pieces to be magnetized oppositely so that a horizontally recorded magnetic transition is written.

* * * * *